United States Patent
Carminati et al.

(10) Patent No.: US 9,835,850 B2
(45) Date of Patent: *Dec. 5, 2017

(54) MIRROR MICROMECHANICAL STRUCTURE AND RELATED MANUFACTURING PROCESS

(71) Applicant: STMicroelectronics S.r.l., Agrate Brianza (IT)

(72) Inventors: Roberto Carminati, Piancogno (IT); Sebastiano Conti, Pregnana Milanese (IT); Sonia Constantini, Missaglia Lecco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 58 days.

This patent is subject to a terminal disclaimer.

(21) Appl. No.: 14/961,507

(22) Filed: Dec. 7, 2015

(65) Prior Publication Data

US 2016/0094831 A1    Mar. 31, 2016

Related U.S. Application Data

(62) Division of application No. 14/151,471, filed on Jan. 9, 2014, now Pat. No. 9,544,573.

(30) Foreign Application Priority Data

Jan. 14, 2013    (IT) .............................. TO2013A0031

(51) Int. Cl.
*G02B 26/08*    (2006.01)
*G01B 11/25*    (2006.01)
(Continued)

(52) U.S. Cl.
CPC ...... *G02B 26/0833* (2013.01); *G01B 11/2518* (2013.01); *G02B 26/085* (2013.01);
(Continued)

(58) Field of Classification Search
CPC ............ G02B 26/0833; G02B 26/0841; G02B 26/085; G02B 26/0858; G02B 26/105;
(Continued)

(56) References Cited

U.S. PATENT DOCUMENTS

| 2005/0063038 | A1 | 3/2005 | Filhol |
| 2008/0100899 | A1 | 5/2008 | Shimokawa et al. |
| 2010/0265473 | A1* | 10/2010 | Yamashita ........... G02B 26/105 353/85 |

FOREIGN PATENT DOCUMENTS

| EP | 0650133 A2 | 4/1995 |
| WO | WO-0104680 A1 | 1/2001 |

OTHER PUBLICATIONS

Italian Search Report and Written Opinion for IT TO2013A000031 dated Jul. 23, 2013 (10 pages).

(Continued)

*Primary Examiner* — James Phan
(74) *Attorney, Agent, or Firm* — Gardere Wynne Sewell LLP

(57) ABSTRACT

A mirror micromechanical structure has a mobile mass carrying a mirror element. The mass is drivable in rotation for reflecting an incident light beam with a desired angular range. The mobile mass is suspended above a cavity obtained in a supporting body. The cavity is shaped so that the supporting body does not hinder the reflected light beam within the desired angular range. In particular, the cavity extends as far as a first side edge wall of the supporting body of the mirror micromechanical structure. The cavity is open towards, and in communication with, the outside of the mirror micromechanical structure at the first side edge wall.

27 Claims, 8 Drawing Sheets

(51) Int. Cl.
*G02B 26/10* (2006.01)
*H04N 5/225* (2006.01)
*H04N 13/02* (2006.01)
*G03B 21/00* (2006.01)

(52) U.S. Cl.
CPC ..... *G02B 26/0841* (2013.01); *G02B 26/0858* (2013.01); *G02B 26/105* (2013.01); *H04N 5/2254* (2013.01); *H04N 5/2256* (2013.01); *H04N 5/2257* (2013.01); *H04N 13/021* (2013.01); *H04N 13/0235* (2013.01); *H04N 13/0253* (2013.01); *G03B 21/008* (2013.01); *Y10T 29/49* (2015.01)

(58) Field of Classification Search
CPC ... G03B 21/008; G01B 11/2518; Y10T 29/49; H04N 5/225; H04N 5/2257; H04N 13/021; H04N 13/0235; H04N 13/0253; Y10S 359/904
USPC ......... 359/212.1, 199.1–199.4, 200.6–200.8, 359/224.1–224.2, 298, 212.2
See application file for complete search history.

(56) References Cited

OTHER PUBLICATIONS

Fechteler, Philipp, et al: "Fast and High Resolution 3D Face Scanning," http://iphome.hhi.de/fechteler, Proceedings of the 14th International Conference on Image Processing 2007, San Antonio, Texas, USA, Sep. 2007 (4 pages).

\* cited by examiner

MIRROR MICROMECHANICAL STRUCTURE AND RELATED MANUFACTURING PROCESS

CROSS-REFERENCE TO RELATED APPLICATIONS

This application is a divisional application from U.S. application for patent Ser. No. 14/151,471 filed Jan. 9, 2014, which claims priority from Italian Application for Patent No. TO2013A000031 filed Jan. 14, 2013, the disclosures of which are incorporated by reference.

TECHNICAL FIELD

The present invention relates to a mirror micromechanical structure and to a related manufacturing process.

BACKGROUND

Mirror micromechanical structures are known, which are made, at least in part, of semiconductor materials and using the MEMS (microelectromechanical systems) technology.

These micromechanical structures are integrated in portable apparatuses, such as, for example, portable computers, laptops, notebooks (including ultra-thin notebooks), PDAs, tablets, and smartphones, for optical operations, in particular for directing in desired patterns light radiation beams generated by a light source.

Thanks to the reduced dimensions, these structures enable stringent requirements to be met as regards occupation of space, in terms of area and thickness.

For example, mirror micromechanical structures are used in miniaturized projector modules (the so-called "picoprojectors"), which are able to project images at a distance or to generate desired patterns of light.

In combination with an image-capturing module, a projector module of this kind enables, for example, implementation of a three-dimensional (3D) photographic camera or video camera for forming three-dimensional images.

The aforesaid mirror micromechanical structures generally include: a mirror element, obtained from a body of semiconductor material in such a way as to be movable, for example with a tilting or rotation movement, to direct the incident light beam as desired; and a supporting element, which is also obtained starting from a body of semiconductor material, is coupled to the mirror element, and has supporting and handling functions. A cavity is made in the supporting element, underneath, and in a position corresponding to, the mirror element, in such a way as to enable freedom of movement for tilting or rotation thereof.

In particular, applications are known in which the mirror micromechanical structure is required to generate a reflection pattern with an extensive field of view (FOV), i.e., a reflection of the incident light beam over a wide angular range.

For example, FIG. 1a is a schematic illustration of an optical projection system, designated as a whole by 1, in which the mirror micromechanical structure 2 is used for reflecting, with a desired angle, an incident light beam, designated by B, coming from a light source 3, for example, a coherent light source of a laser type.

In particular, the mirror micromechanical structure 2, including the mirror element, here designated by 4, and the supporting element, here designated by 5, in which the cavity 6 is obtained, is mounted in such a way that the mirror element 4 is set, at rest, at a wide inclination angle $\alpha$ with respect to the incident light beam B (the inclination angle $\alpha$ being defined as the angle between the direction of the incident light beam B and the normal to the surface of the mirror element 4). This inclination angle may be comprised between 40° and 50°, for example 45°, and evidently corresponds also to the angle at which the incident light beam is reflected by the mirror element 4.

FIGS. 1b and 1c show a respective operating condition of the optical system 1, in which the mirror element 4 is rotated through a negative rotation angle $\theta$ (causing, that is, a reduction in the inclination angle $\alpha$), and, respectively, a positive rotation angle $\theta$ (causing, that is, an increase in the inclination angle $\alpha$), with respect to the resting condition.

It will be noted that the solution described is affected by an important limitation as regards the field of view (FOV) that can be achieved, which cannot guarantee the desired optical performance, at least in given operating conditions.

As shown schematically in FIG. 2, in fact, for positive inclinations of the mirror element 4, which entail values of the inclination angle $\alpha$ greater than a given threshold, a phenomenon of at least partial shadowing or clipping of the reflected light beam may arise, thereby only a part of the reflected light beam may effectively be transmitted towards the outside of the mirror micromechanical structure 2, for example for generation of a desired scanning pattern on an outer surface.

The specific value of this threshold depends on the particular assembly of the mirror micromechanical structure 2. In any case, there is a mechanical rotation angle $\theta$ of the mirror element 4 such that the reflected light beam can be at least partially shadowed.

In the example illustrated, this phenomenon is highlighted for a positive rotation angle $\theta$ of 20° with respect to the resting condition.

The phenomenon described entails an undesirable deterioration of the performance of the optical system 1. In particular, the optical system 1 may be unable to achieve the desired performance as regards the field of view FOV.

There is a need in the art to solve, at least in part, this problem afflicting mirror micromechanical structures of a known type.

SUMMARY

According to the present invention, a mirror micromechanical structure and a corresponding manufacturing process are consequently provided.

In an embodiment, a mirror micromechanical structure, comprises: a mobile mass which carries a mirror element and is configured to be driven in rotation for reflecting an incident light beam with a desired angular range (FOV); said mobile mass suspended above a cavity provided in a supporting body including semiconductor material, wherein said cavity is so shaped that said supporting body does not hinder the light beam reflected by said mirror element within said desired angular range (FOV).

In an embodiment, an optical device comprises: a mirror micromechanical structure having: a mobile mass which carries a mirror element and is configured to be driven in rotation for reflecting an incident light beam with a desired angular range (FOV); said mobile mass suspended above a cavity provided in a supporting body including semiconductor material, wherein said cavity is so shaped that said supporting body does not hinder the light beam reflected by said mirror element within said desired angular range (FOV).

In an embodiment, a process for manufacturing a mirror micromechanical structure comprises: forming a mobile mass which carries a mirror element and is drivable in rotation for reflecting an incident light beam within a desired angular range (FOV); and forming a cavity which is designed to be set underneath said mobile mass in a supporting body designed to be coupled to said mobile mass; wherein forming the cavity comprises: shaping said cavity so that said supporting body does not hinder the reflected light beam within said desired angular range (FOV).

BRIEF DESCRIPTION OF THE DRAWINGS

For a better understanding of the present invention, preferred embodiments thereof are now described, purely by way of non-limiting example and with reference to the attached drawings, wherein.

DETAILED DESCRIPTION OF THE DRAWINGS

Figure 1A:
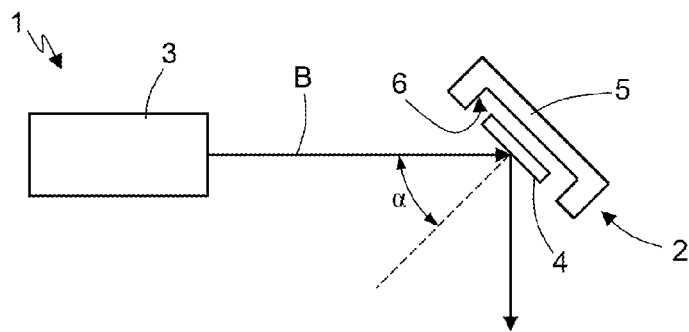
FIGS. 1a-1c are schematic views of an optical system including a mirror micromechanical structure, in different operating conditions.
Figure 1B:
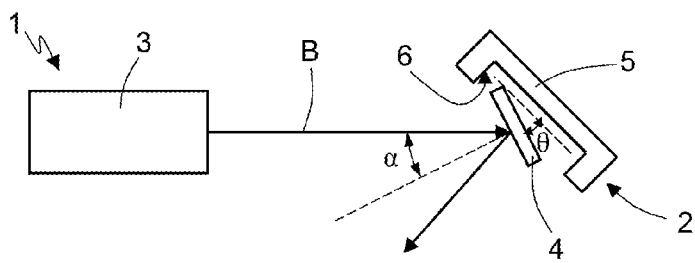
Figure 1C:
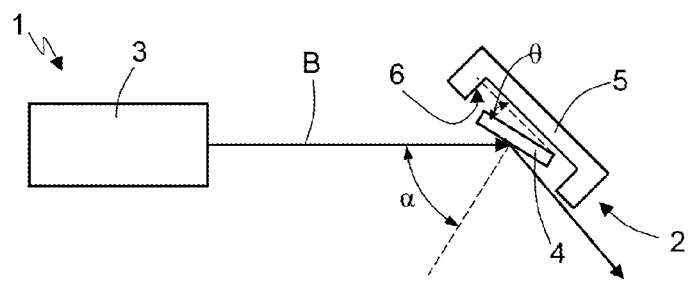
Figure 2:
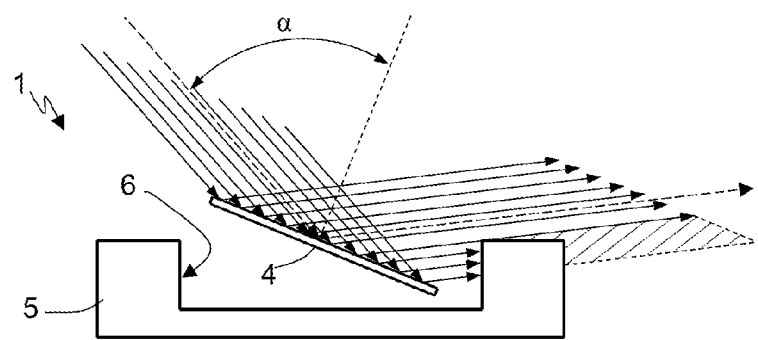
FIG. 2 is a schematic view of the optical system, in yet a different operating condition.
Figure 3:
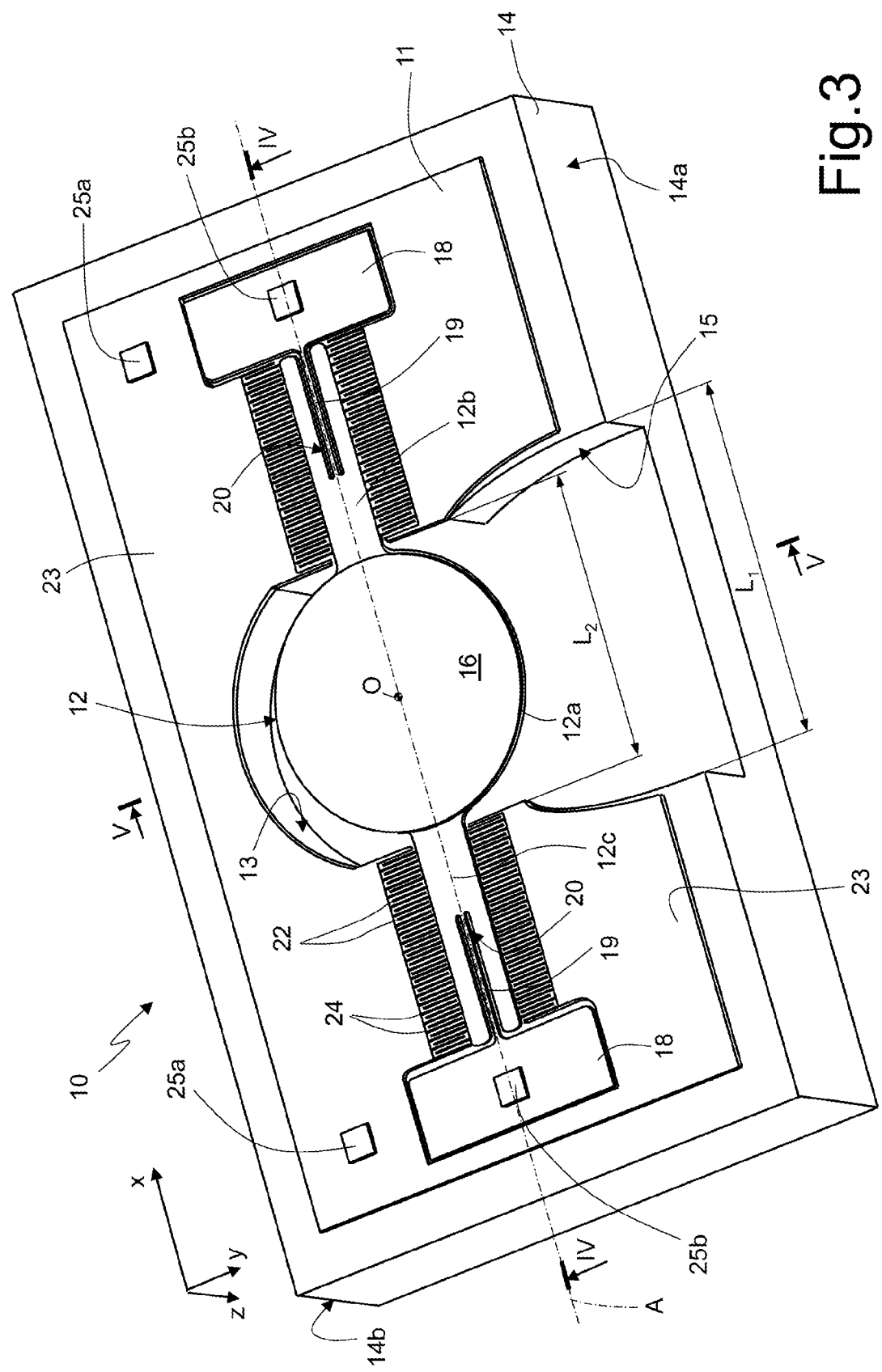
FIG. 3 is a perspective plan view of a mirror micromechanical structure according to an aspect of the present solution.
Figure 4:
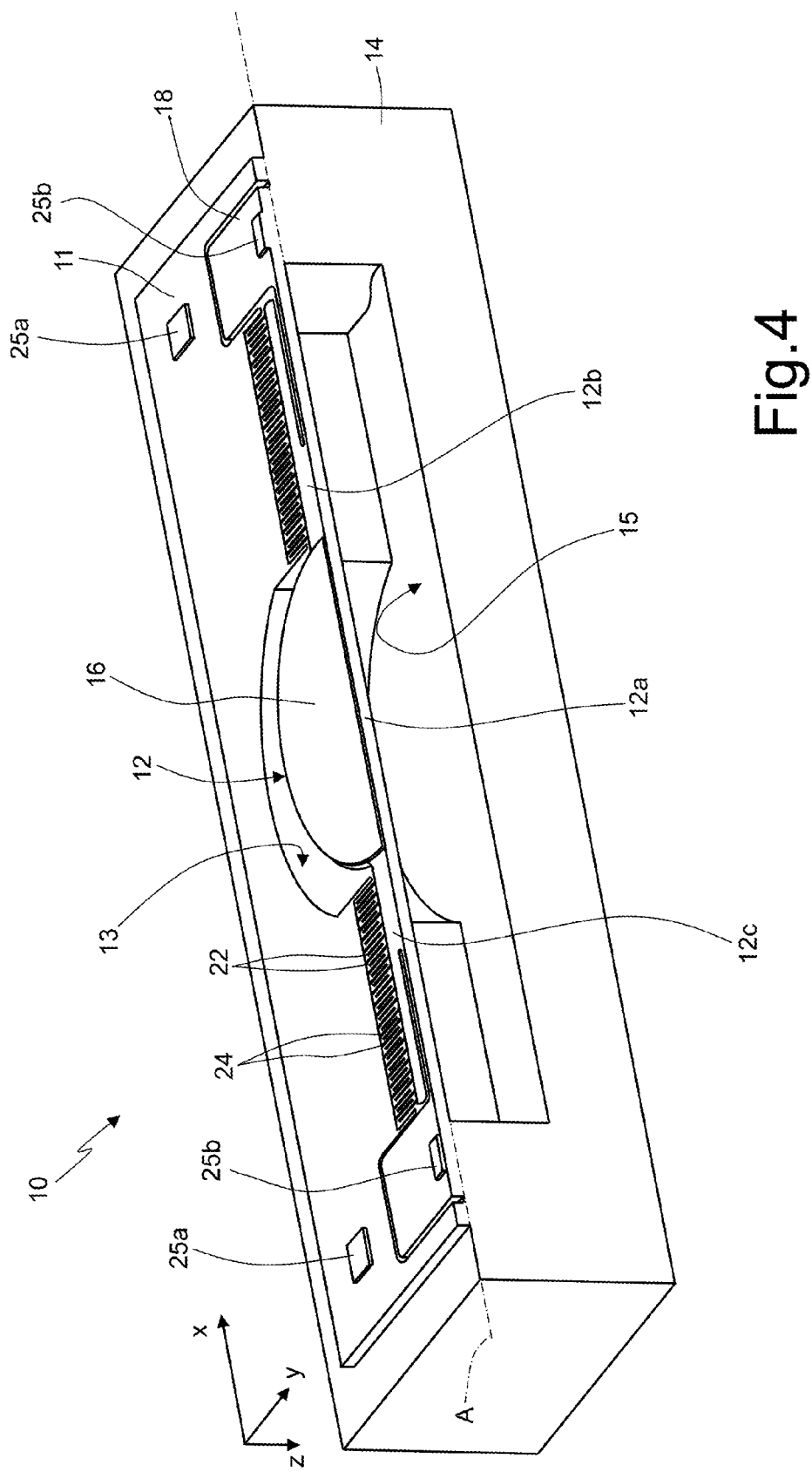
FIGS. 4 and 5 are sections of the micromechanical structure of FIG. 3, taken along respective lines of section IV-IV and V-V shown in FIG. 3.
Figure 5:
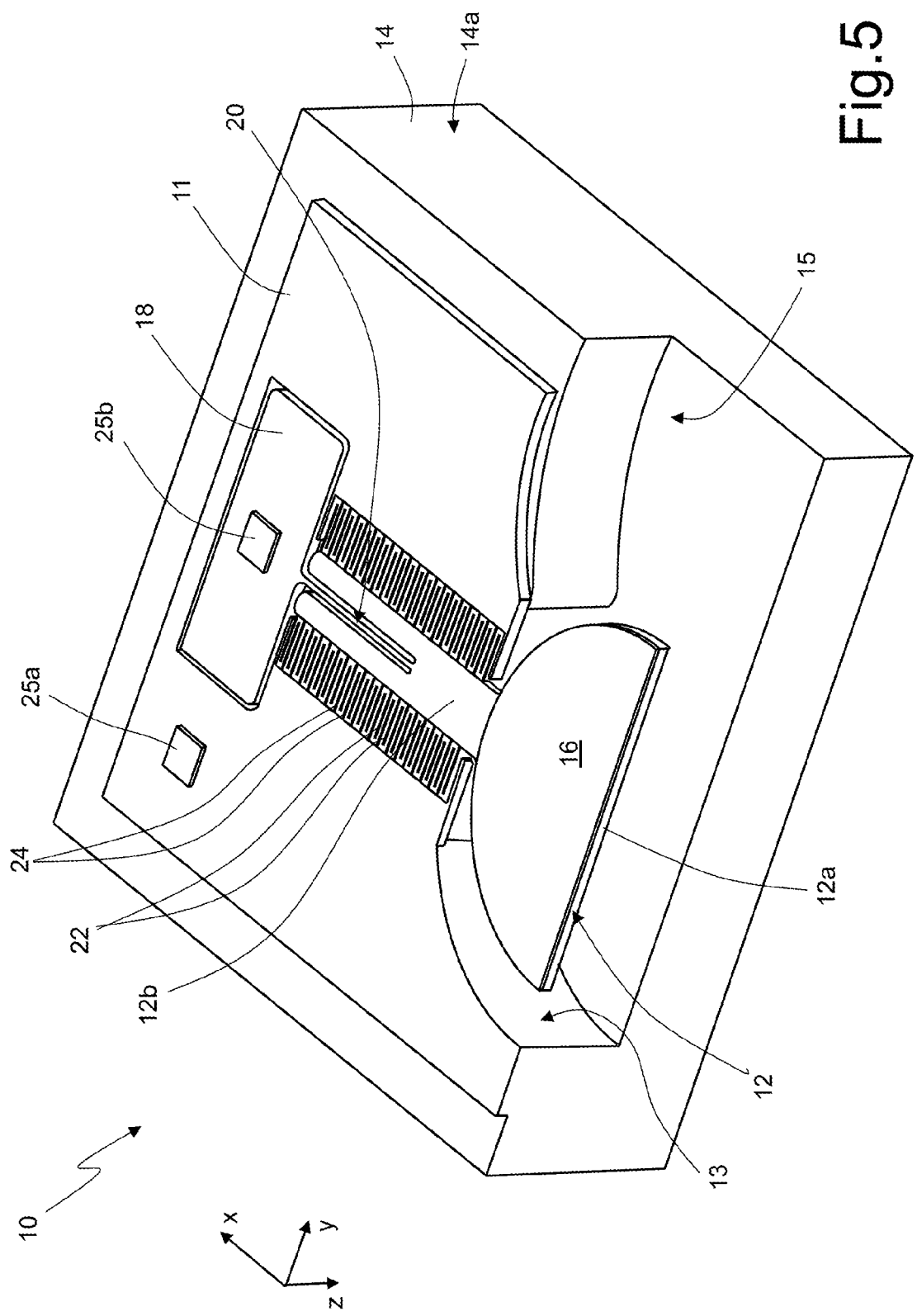

FIGS. 3-5 show, in respective views, a possible embodiment of a mirror micromechanical structure 10, made using MEMS techniques proper to the semiconductor industry.

In detail, the mirror micromechanical structure 10 comprises: a first body of semiconductor material, for example silicon, here designated by 11, in which a mobile mass 12 is provided, for example by removal of material with chemical etching; the mobile mass 12 has a main extension in a horizontal plane xy and a thickness that is substantially negligible with respect to its extension in the horizontal plane xy along a vertical axis z, orthogonal to the same horizontal plane xy. The mobile mass 12 is surrounded by a trench 13, which is opened in the first body 11 due to the same chemical etching.

The mirror micromechanical structure 10 further comprises a second body of semiconductor material, for example silicon, here designated by 14, coupled to the first body 11, in which a cavity, or opening, 15 is provided, for example by removal of material with deep dry chemical etching.

The cavity 15 has a certain height in the vertical direction z, smaller than an overall thickness of the second body 14 (for example, equal to approximately half of this thickness), so that the second body 14 defines a base or bottom surface of the cavity 15.

The mobile mass 12, as described hereinafter, is suspended above the cavity 15, and in a resting condition is substantially parallel to, and faces, the bottom surface of the cavity 15 and the horizontal plane xy.

The mobile mass 12 has a central portion 12a, for example circular in plan view (in the horizontal plane xy), set on which is a mirror layer 16, constituted by a material with high reflectivity in regard to the light radiation to be projected, such as for example aluminum or gold. The mobile mass 12 also has end portions 12b, 12c, having an elongated shape and extending on opposite sides with respect to the mobile mass 12 along a first horizontal axis x of the horizontal plane xy.

The mobile mass 12 is coupled, at the end portions 12b, 12c, to anchorages 18, fixed with respect to the second body 14, by means of elastic elements 19, of a torsional type, which enable rotation thereof out of the horizontal plane xy.

The elastic elements 19 have a longitudinal extension along the first horizontal axis x, within respective recesses 20 inside the end portions 12b, 12c of the mobile mass 12, and are very thin, i.e., having a length along the aforesaid first horizontal axis x that is much greater than the corresponding width (along a second horizontal axis y of the horizontal plane xy, which forms with the first horizontal axis x and the vertical axis z three Cartesian axes) and greater than the corresponding thickness along the same vertical axis z.

The elastic elements 19 moreover define, in their direction of extension and alignment, an axis of rotation A for the mobile mass 12, passing through the geometrical center O of the central portion 12a of the same mobile mass 12.

The aforesaid end portions 12b, 12c moreover carry in a fixed way mobile electrodes 22, shaped like fingers, extending in the horizontal plane xy on opposite sides of the same end portions 12b, 12c along the second horizontal axis y and within the trench 13.

The mirror micromechanical structure 10 further comprises a fixed portion 23, obtained in the first body 11 and fixed with respect to the second body 14, separated from the mobile mass 12 by the trench 13. The fixed portion 23 carries fixed electrodes 24, which also have a finger-like conformation and a longitudinal extension along the second horizontal axis y within the trench 13, in a position facing and comb-fingered with the mobile electrodes 22.

First contact pads 25a and second contact pads 25b are carried by respective top surfaces of the fixed portion 23 and of the anchorages 18, for electrical biasing, respectively, of the fixed electrodes 24 and of the mobile electrodes 22.

In use, application (in a known way, here not illustrated) of a difference of potential between the mobile electrodes 22 and the fixed electrodes 24 causes torsion of the elastic elements 19 and rotation of the mobile mass 12 (and of the associated mirror layer 16) out of the horizontal plane xy about the axis of rotation A, according to the desired movement so as to reflect an incident light beam towards the outside of the mirror micromechanical structure 10.

Again in a known manner, the mobile mass 12 may be rotationally driven with an oscillatory movement at its mechanical resonance frequency in order to maximize the extent of its movement, given a same electrical biasing.

According to one aspect of the present embodiment, the cavity 15 is shaped in such a way that the second body 14 in which it is obtained does not hinder the light beam reflected by the mirror layer 16 set on the mobile mass 12, without creating even partial clipping or shadowing of the reflected light beam.

In particular, the cavity 15 extends in the second body 14 along the second horizontal axis y (i.e., in a direction transverse to the axis of rotation A), in such a way as to reach a first edge wall 14a that delimits, parallel to the first horizontal axis x, the second body 14 and the entire mirror micromechanical structure 10.

On the opposite side of the axis of rotation A, the cavity 15 is instead delimited by a side wall, defined by the fixed portion 23 of the mirror micromechanical structure 10 and by the underlying portion of the second body 14. On the same side of the axis of rotation A, the mirror micromechanical structure 10 has a second edge wall 14b, which is continuous and uninterrupted throughout the thickness of the second body 14.

The cavity 15 hence has an open portion at the aforesaid first edge wall 14a, being open towards the outside of the mirror micromechanical structure 10 and in fluid communication with the outside of the mirror micromechanical structure 10.

The recess 13 that surrounds the mobile mass 12 in the first body 11 also extends in the horizontal plane xy parallel to the cavity 15 and in a way corresponding thereto.

Moreover, in the example illustrated, the cavity 15 has, at the first edge wall 14a a first width $L_1$ (measured along the first horizontal axis x), which is greater than a second width $L_2$ that the same cavity 15 has underneath the central portion 12a of the mobile mass 12 (the second width $L_2$ basically corresponding to the diameter of the central portion 12a of the mobile mass 12).

The process for manufacturing the mirror micromechanical structure 10 may envisage: first, the formation of the cavity 15 inside the second body 14; and then coupling, via bonding, of the first body 11 on the second body 14, provided with the cavity 15, and subsequent formation by chemical etching of the mobile mass 12.

Figure 6:
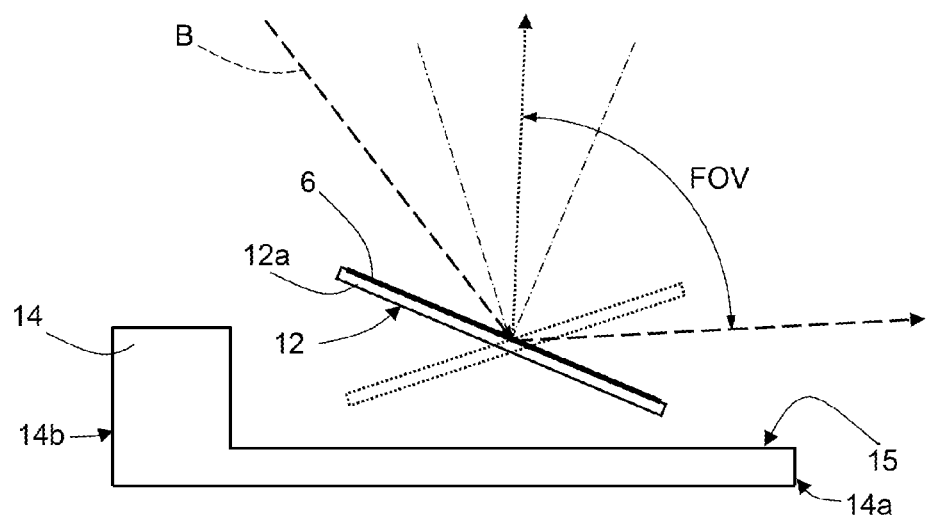
FIG. 6 is a schematic view of the micromechanical structure of FIG. 3, in an operating condition.

As illustrated schematically in FIG. 6, the conformation of the cavity 15, with lateral opening towards the outside of the mirror micromechanical structure 10, at the first edge wall 14a, is such that the light beams reflected by the mirror layer 16 carried by the mobile mass 12 do not undergo any shadowing or clipping, even for wide angles of inclination α of the incident light beam, thus ensuring an extensive field of view FOV for the resulting optical system.

In particular, FIG. 6 shows the entire field of view FOV that can be obtained, in the example approximately 80°, as a function of a position of negative maximum inclination and of a position of positive maximum inclination of the mobile mass 12, for example with a rotation angle θ, respectively, of between −15° and −25°, in the example illustrated approximately −20°, and of between +15° and +25°, in the example illustrated approximately +20°, with respect to the resting position.

For instance, the mobile mass 12 may even have a rotation angle θ equal to 25° (starting from an initial position at 40° with respect to the incident light beam), or equal to 20° (starting from an initial position at 50°), without any shadowing of the reflected light beam.

Figure 7:
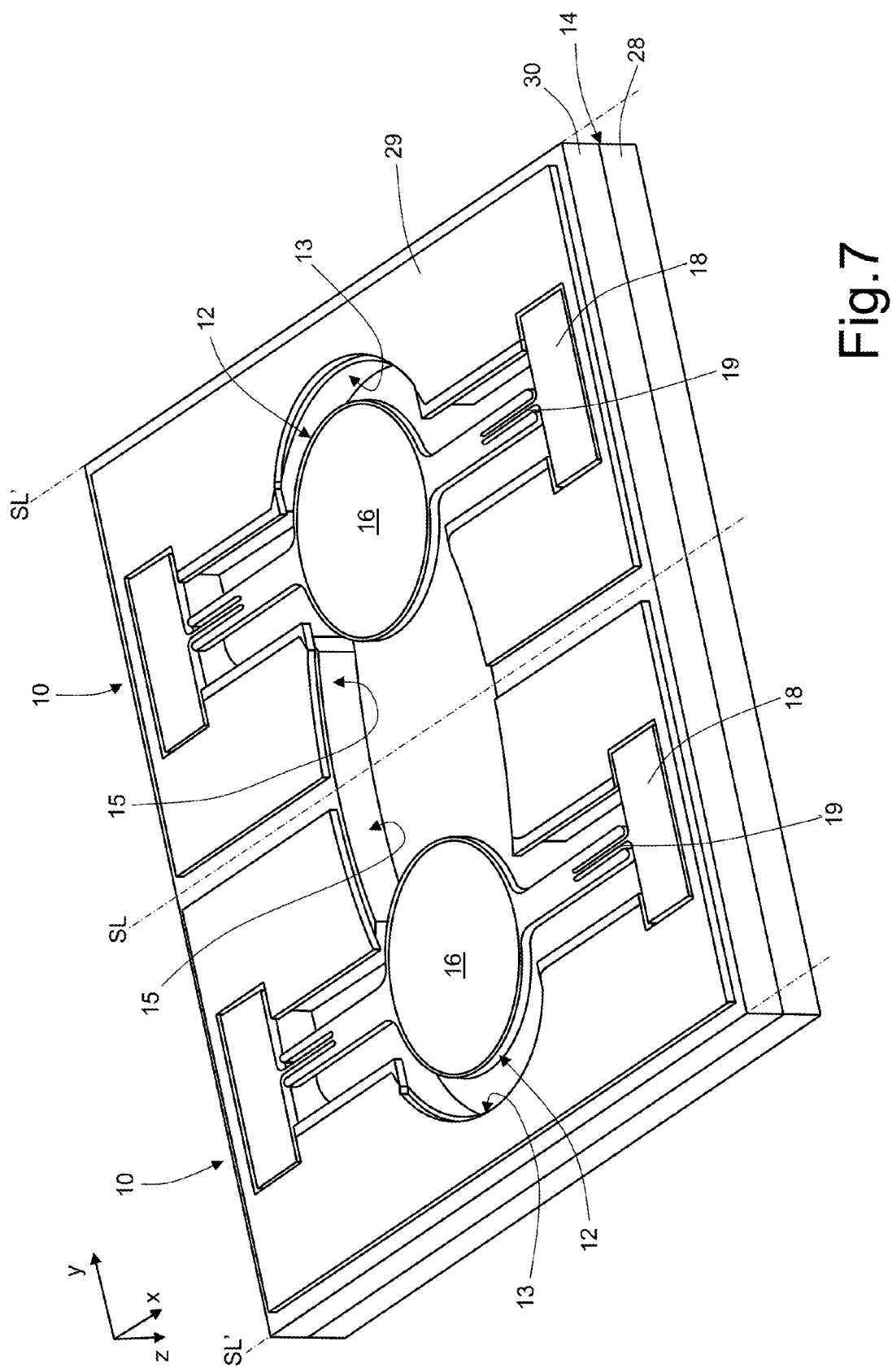
FIG. 7 is a perspective plan view of a wafer of semiconductor material including mirror micromechanical structures, according to one embodiment of the present solution.

FIG. 7 (which is simplified for reasons of clarity of illustration) regards a final step of the process for manufacturing the mirror micromechanical structure 10, before which previous process steps have been carried out to form, amongst other elements, the cavity 15 and the mobile mass 12.

The mirror micromechanical structure 10 is the result of a dicing operation, along scribe lines SL, SL' parallel to the first horizontal axis x.

One aspect of the present solution envisages, in particular, that the dicing operation is carried out via a laser, in order to prevent any residue of particles or water, which might subsequently jeopardize the optical performance of the system.

In the embodiment shown in FIG. 7, the mirror micromechanical structures 10 are, in particular, obtained starting from a SOI (silicon-on-insulator) structure, with a first wafer 29 (equivalent to the first body 11) constituted by the active layer of the SOI structure and a second wafer 30 constituted by the deep layer of the SOI structure, coupled at the back to a further supporting wafer 28 via bonding (in this case, the assembly of the wafers 28 and 30 constitute the second body 14). The manufacturing process is thus simplified in so far as the cavity 15 may be obtained by etching the second wafer 30 from the back, and definition of the mobile mass 12 may be obtained via selective etching of the semiconductor material of the first wafer 29.

Inside the wafers 28, 29, 30, appropriately coupled to one another, a plurality of mirror micromechanical structures 10 have thus been previously obtained, and the dicing operation for their separation is carried out as back-end process stage.

Adjacent mirror micromechanical structures 10 are symmetrical and specular with respect to the scribe lines SL, SL'.

In the embodiment illustrated in FIG. 7, mirror micromechanical structures 10, adjacent to one another, have cavities 15 communicating and facing one another along first scribe lines $S_L$.

After the dicing operation, which leads to opening of the cavity 15 towards the outside, the first edge wall 14a of each mirror micromechanical structure 10 is moreover defined along the same first scribe lines $S_L$. Simultaneously defined along second scribe lines $S_L'$, which alternate with the first scribe lines $S_L$ along the second horizontal axis y, are the second edge walls 14b of the mirror structures 10.

Figure 8:
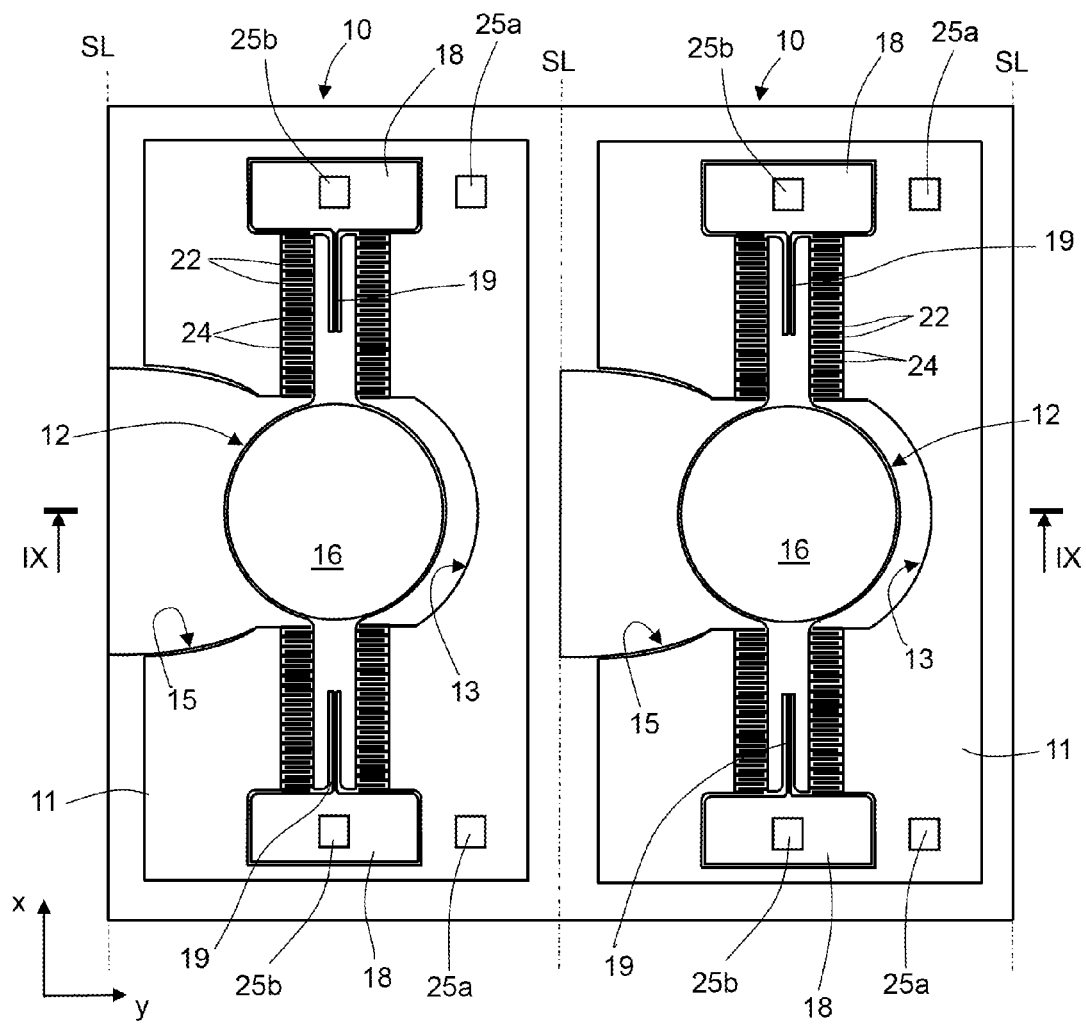
FIG. 8 is a top plan view of a wafer of semiconductor material including mirror micromechanical structures, according to a different embodiment of the present solution.

FIG. 8 shows a different embodiment, in which mirror micromechanical structures 10, adjacent to one another, are set alongside one another along the scribe lines, here designated as a whole by SL, without the respective cavities 15 communicating with one another.

Figure 9:
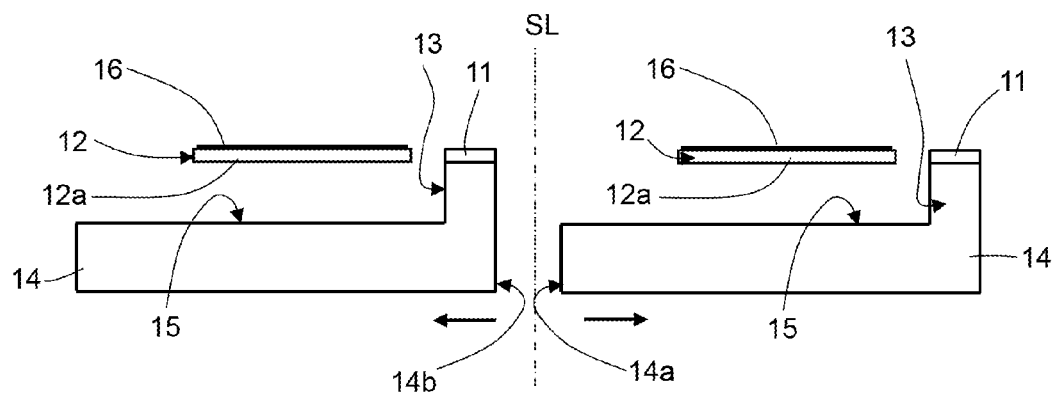
FIG. 9 is a cross-sectional view of the wafer of FIG. 8, taken along the line of section IX-IX.

In this case, the dicing operation carried out along each scribe line $S_L$ leads to opening of a respective cavity 15 for a first mirror micromechanical structure 10, and at the same time to definition of the second edge wall 14b of a second mirror micromechanical structure 10 adjacent thereto, as highlighted also in the cross-sectional view of FIG. 9 (relating to the result of the step of dicing along the scribe lines SL).

The above embodiment may prove advantageous in given applications in so far as the assembly is, prior to dicing, sturdier and stronger from the mechanical standpoint, hence being less subject to any possible failure or damage.

The advantages of the solution described emerge clearly from the foregoing description.

It is in any case emphasized that it is possible to obtain extremely compact dimensions of the final micromechanical structure, at the same time ensuring high optical performance, in particular as regards the extension of the field of view FOV.

It is, for example, possible to obtain angular scanning ranges of the reflected light beam comprised between 80° and 100°, without the intervening phenomena of clipping or shadowing of the reflected light beam.

The manufacturing process does not require additional process steps as compared to traditional solutions in so far as the lateral opening of the cavity 15 is obtained by means of the same dicing operations as those that lead to separation of the various dice of the mirror micromechanical structures.

The manufacturing process is particularly advantageous in the case where SOI structures are used.

The aforesaid characteristics thus render use of the mirror micromechanical structure particularly advantageous in optical systems integrated inside portable devices.

Figure 10:
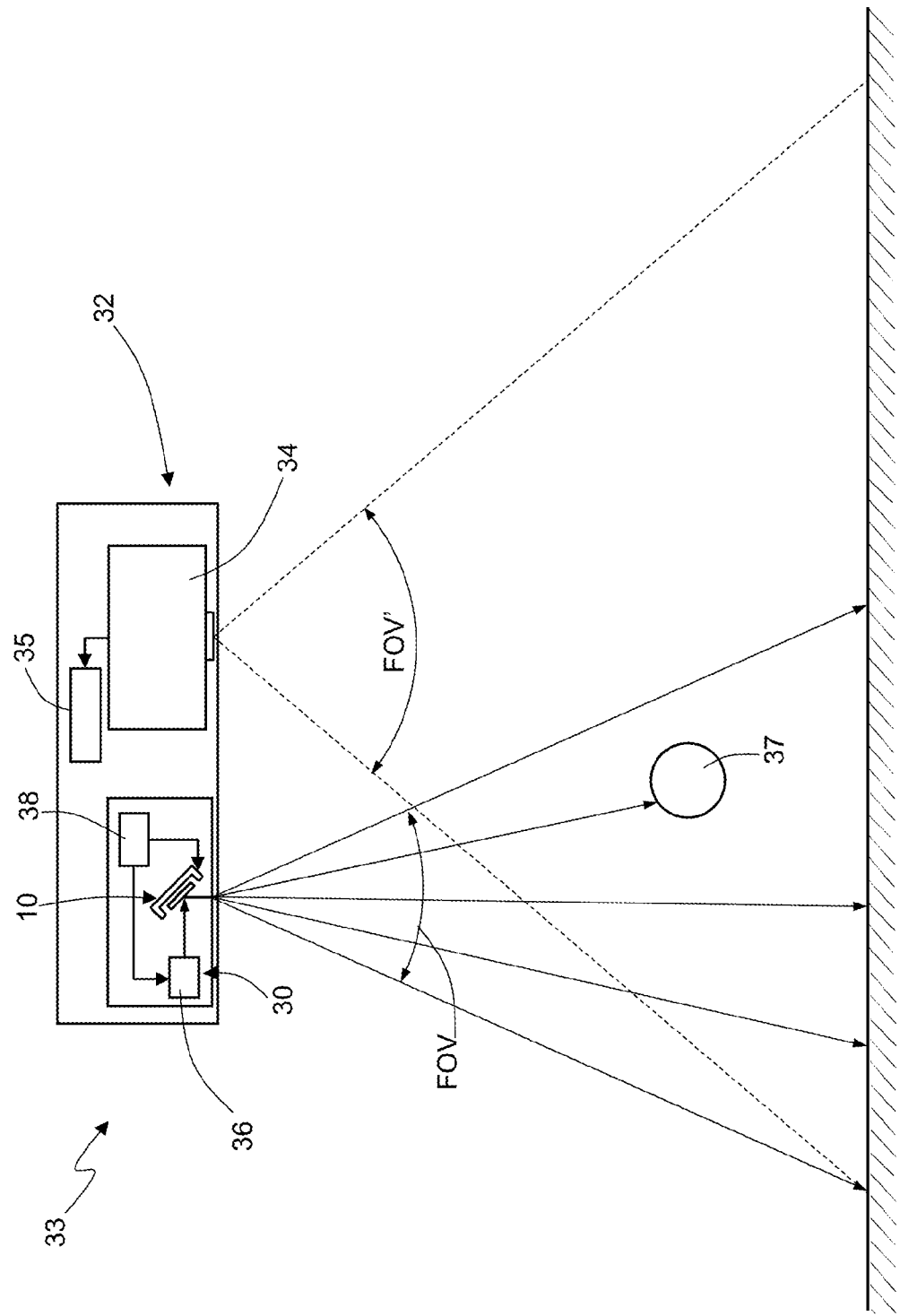
FIG. 10 is a schematic representation of an optical device, according to an aspect of the present solution.

By way of example, FIG. 10 is a schematic illustration of the operation of the mirror micromechanical structure 10 in a projector module 30 of a device for formation of three-dimensional images 32 in a portable apparatus 33 (such as, for example, a notebook portable computer), which further comprises an image-capturing module 34, for example operating in the infrared field, and a processing module 35.

In particular, the mirror micromechanical structure 10 is driven so as to project the light beam generated by a light source 36, for example a source of coherent light of a laser type, according to a scanning pattern, within the field of view FOV, which also includes an object 37 of which the three-dimensional image is to be reconstructed.

Conveniently, the mobile mass 12 of the mirror micromechanical structure 10 is oriented, in a condition of rest, at a wide angle of inclination with respect to the incident light beam generated by the light source 36, for example between 40° and 50°.

The projector module 36 comprises an appropriate electronic control and driving circuit 38, which is able to supply appropriate driving signals both to the light source 36 and to the mirror micromechanical structure 10 so as to vary the orientation thereof according to the scanning pattern desired for the reflected light beam.

Advantageously, also the electronic circuit 38 may be obtained in an integrated way with semiconductor techniques, possibly in the same die as the one in which the mirror micromechanical structure 10 is obtained.

The image-capturing module 34, set alongside the projector module 30 within the package of the device for formation of three-dimensional images 32, has a respective field of view FOV' such as to frame the pattern of parallel lines projected by the projector module 30 and generate corresponding two-dimensional images.

In a known manner, here not described in detail, the processing module 35 is thus able to reconstruct a three-dimensional image of the object 37, and of the surrounding environment, exploiting the parallax principle, processing with appropriate algorithms the images captured by the image-capturing module 34 in order to determine the depth and distances in the three-dimensional space.

Finally, it is clear that modifications and variations may be made to what has been described and illustrated herein, without thereby departing from the scope of the present invention, as defined in the annexed claims.

In particular, the conformation of the cavity 15 may possibly differ from the one previously illustrated, provided that it is in any case shaped in such a way that the second body 14 in which it is obtained does not hinder the reflected light beam, as previously discussed in detail.

Figure 11:
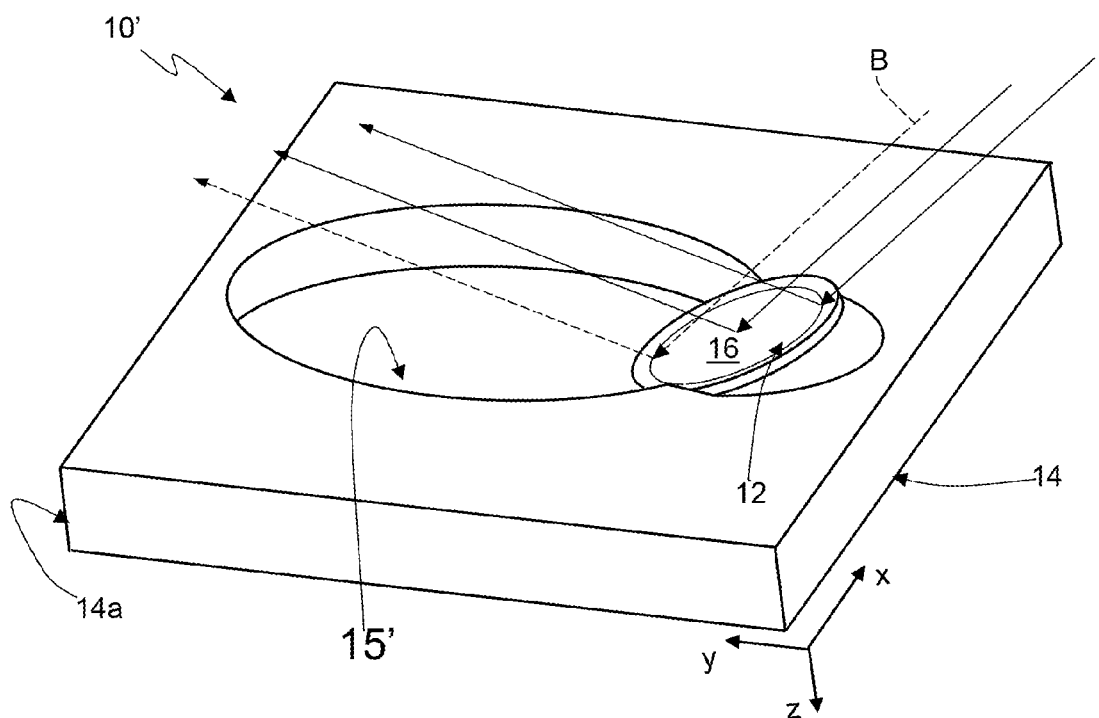
FIG. 11 is a perspective view of a variant of the mirror micromechanical structure.

In this regards, FIG. 11 is a schematic illustration of a possible variant embodiment of the mirror micromechanical structure 10.

In this variant, the cavity 15 does not extend as far as the first edge wall 14a of the mirror micromechanical structure 10, but in any case has an elongated conformation along the second axis y such that the presence of the lateral delimitation wall (in this case entirely surrounding the cavity 15) does not hinder the reflected light beam within the desired field of view and with reference to the rotations allowed for the mobile mass 12. This variant embodiment envisages, however, a greater size of the die of the mirror micromechanical structure 10.

Moreover, the cavity 15 could possibly extend from either side of the axis of rotation A, until it reaches both of the edge walls 14a, 14b of the micromechanical structure 10.

Driving of the mobile mass 12 could also be obtained employing a different technique, for example a piezoelectric or magnetic technique.

As it has been previously emphasized, the mirror micromechanical structure 10 may in general be used for any optical system and portable apparatus that requires reflection of a light beam with a reduced occupation of space and a wide field of view.

What is claimed is:

1. An optical device, comprising:
   a mirror micromechanical structure having:
      a mobile mass which carries a mirror element and is configured to be driven in rotation for reflecting an incident light beam with a desired angular range;
      said mobile mass suspended above a cavity provided in a supporting body including semiconductor material,
      wherein said cavity is so shaped that said supporting body does not hinder the light beam reflected by said mirror element within said desired angular range; and
      wherein said mirror element is carried by said mobile mass in a condition of rest at an angle of inclination formed between a normal to a surface of said mirror and said incident light beam of between 40° and 50°, and a movement of rotation of said mobile mass for said angular range has an angular extension comprised between −(15 to 25°) and +(15 to 25°) with respect to said condition of rest.

2. The device according to claim 1, further comprising:
   an image-projection module including said mirror micromechanical structure and a source operable for generating said incident light beam; and
   an image-capturing module operatively coupled to said image-projection module for capturing images associated to the light beam reflected by said mirror micromechanical structure.

3. The device according to claim 2, further comprising a processing module configured to receive and process the images captured by said image-capturing module to form three-dimensional images.

4. The device according to claim 2, wherein the image-capturing module has a field of view which at least partially overlaps the desired angular range.

5. The device according to claim 4, wherein the image projection module is configured to project within the desired angular range a pattern of parallel lines, and wherein the image-capturing module is configured to obtain corresponding two-dimensional images.

6. The device according to claim 5, further comprising a processing module configured to receive and process the two-dimensional images captured by said image-capturing module to reconstruct a three-dimensional image of an object and its surrounding environment.

7. The device according to claim 6, wherein the processing module uses a parallax principle processing algorithms to process the two-dimensional images captured by the image-capturing module in order to determine depth and distance in three-dimensional space.

8. The device according to claim 1, wherein said cavity extends as far as a first side edge wall of said supporting body, being open towards, and communicating with, an outside edge of said mirror micromechanical structure at said first side edge wall.

9. The device structure according to claim 8, wherein said mobile mass has a rotational movement about an axis of rotation, and wherein said cavity extends as far as said first side edge wall along an axis of extension, transverse to said axis of rotation.

10. The device according to claim 8, wherein said cavity has a first width, at said first side edge wall, and a second width, underneath said mobile mass, wherein said second width is smaller than said first width.

11. The device according to claim 1, wherein said mobile mass is coupled to anchorages towards said supporting body via elastic torsional elements which define an axis of rotation for said mobile mass.

12. The device according to claim 1, further comprising a structural body in which said mobile mass is defined and coupled to said supporting body.

13. The device according to claim 12, wherein said structural body and said supporting body are defined from a silicon-on-insulator wafer.

14. The device according to claim 1, wherein the supporting body has a top surface including said cavity and wherein said mobile mass has a bottom surface coplanar with the top surface of the supporting body and suspended above said cavity in a configuration which permits oscillation of the mobile mass about an axis of rotation.

15. The device according to claim 14, wherein said cavity provides a first open region on a first side of the mobile mass and a second open region on a second side of the mobile mass, said second side located opposite the first side relative to the axis of rotation, said second open region being larger than said first open region.

16. The device of claim 15, wherein said supporting body has a side edge, and wherein said second open region extends to said side edge.

17. An optical device, comprising:
an image-projection module including a mirror micromechanical structure and a source operable for generating an incident light beam, said mirror micromechanical structure having:
a mobile mass which carries a mirror element and is configured to be driven in rotation for reflecting the incident light beam with a desired angular range;
said mobile mass suspended above a cavity provided in a supporting body including semiconductor material,
wherein said cavity is so shaped that said supporting body does not hinder the light beam reflected by said mirror element within said desired angular range;
an image-capturing module operatively coupled to said image-projection module for capturing images associated to the light beam reflected by said mirror micromechanical structure; and
a processing module configured to receive and process the images captured by said image-capturing module to form three-dimensional images.

18. The device according to claim 17, wherein said cavity extends as far as a first side edge wall of said supporting body, being open towards, and communicating with, an outside edge of said mirror micromechanical structure at said first side edge wall.

19. The device according to claim 17, wherein the supporting body has a top surface including said cavity and wherein said mobile mass has a bottom surface coplanar with the top surface of the supporting body and suspended above said cavity in a configuration which permits oscillation of the mobile mass about an axis of rotation.

20. The device according to claim 19, wherein said cavity provides a first open region on a first side of the mobile mass and a second open region on a second side of the mobile mass, said second side located opposite the first side relative to the axis of rotation, said second open region being larger than said first open region.

21. The device of claim 20, wherein said supporting body has a side edge, and wherein said second open region extends to said side edge.

22. An optical device, comprising:
an image-projection module including a mirror micromechanical structure and a source operable for generating an incident light beam, said mirror micromechanical structure having:
a mobile mass which carries a mirror element and is configured to be driven in rotation for reflecting an incident light beam with a desired angular range;
said mobile mass suspended above a cavity provided in a supporting body including semiconductor material,
wherein said cavity is so shaped that said supporting body does not hinder the light beam reflected by said mirror element within said desired angular range;
an image-capturing module operatively coupled to said image-projection module for capturing images associated to the light beam reflected by said mirror micromechanical structure;
wherein the image-capturing module has a field of view which at least partially overlaps the desired angular range;
wherein the image-projection module is configured to project within the desired angular range a pattern of parallel lines, and wherein the image-capturing module is configured to obtain corresponding two-dimensional images; and
a processing module configured to receive and process the two-dimensional images captured by said image-capturing module to reconstruct a three-dimensional image of an object and its surrounding environment.

23. The device according to claim 22, wherein the processing module uses a parallax principle processing algorithms to process the two-dimensional images captured by the image-capturing module in order to determine depth and distance in three-dimensional space.

24. The device according to claim 22, wherein said cavity extends as far as a first side edge wall of said supporting body, being open towards, and communicating with, an outside edge of said mirror micromechanical structure at said first side edge wall.

25. The device according to claim 22, wherein the supporting body has a top surface including said cavity and wherein said mobile mass has a bottom surface coplanar with the top surface of the supporting body and suspended above said cavity in a configuration which permits oscillation of the mobile mass about an axis of rotation.

26. The device according to claim 25, wherein said cavity provides a first open region on a first side of the mobile mass and a second open region on a second side of the mobile mass, said second side located opposite the first side relative to the axis of rotation, said second open region being larger than said first open region.

27. The device of claim 26, wherein said supporting body has a side edge, and wherein said second open region extends to said side edge.

* * * * *

UNITED STATES PATENT AND TRADEMARK OFFICE
CERTIFICATE OF CORRECTION

PATENT NO. : 9,835,850 B2  
APPLICATION NO. : 14/961507  
DATED : December 5, 2017  
INVENTOR(S) : Roberto Carminati et al.

Page 1 of 1

It is certified that error appears in the above-identified patent and that said Letters Patent is hereby corrected as shown below:

In the Claims

At Column 9, Claim number 9, Line number 6, please delete the word "structure".

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*